(No Model.)  
4 Sheets—Sheet 1.

G. W. BONDS.
KEY SEAT CUTTING MACHINE.

No. 289,060.  Patented Nov. 27, 1883.

Witnesses:
Geo. H. Strong
G. H. Strause

Inventor.
Geo. W. Bonds
By Dewey & Co.
Attorney (No Model.)
4 Sheets—Sheet 2.
G. W. BONDS.
KEY SEAT CUTTING MACHINE.
No. 289,060. Patented Nov. 27, 1883.
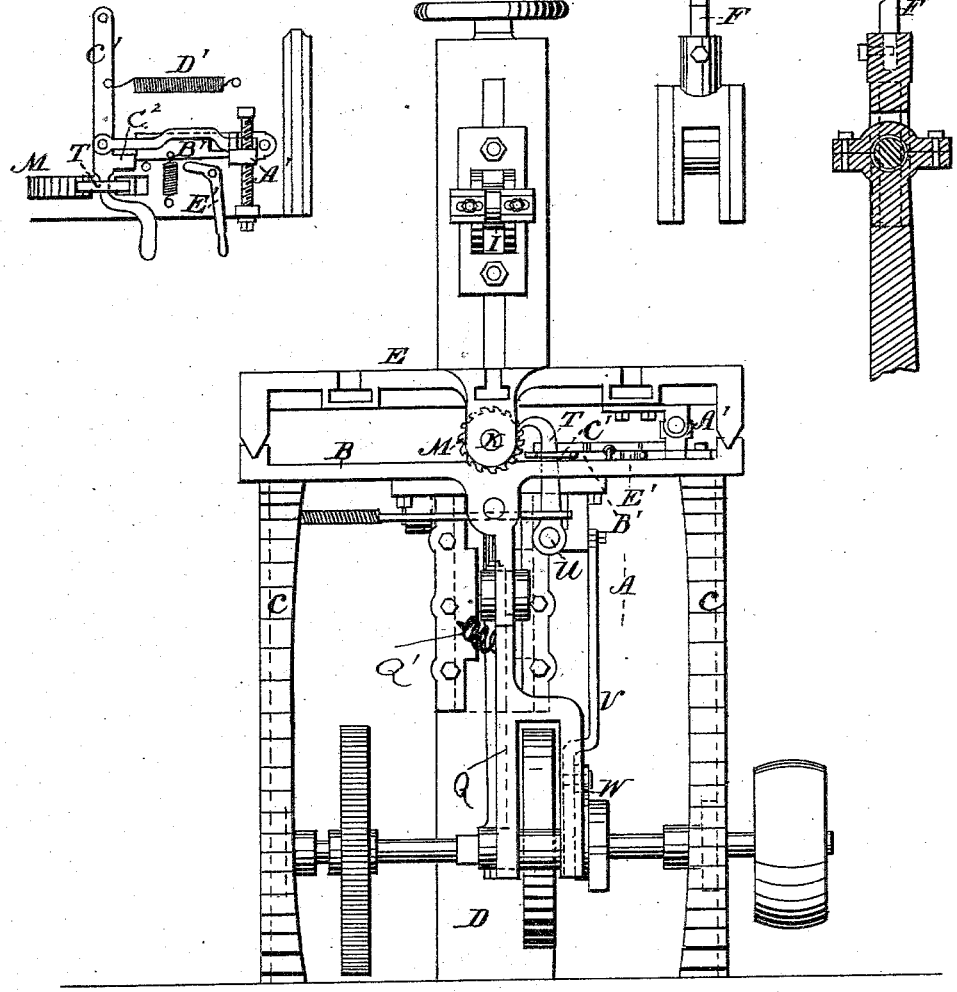
Witnesses
Geo. H. Strong
J. H. Krause
Inventor
Geo. W. Bonds
By Dewey & Co.
Attorneys (No Model.)

4 Sheets—Sheet 3.

G. W. BONDS.
KEY SEAT CUTTING MACHINE.

No. 289,060.

Patented Nov. 27, 1883.

Witnesses,
Geo. H. Strong.
G. H. Crouse

Inventor,
Geo. W. Bonds
By Dewey & Co
Attorneys (No Model.) 4 Sheets—Sheet 4.

G. W. BONDS.
KEY SEAT CUTTING MACHINE.

No. 289,060. Patented Nov. 27, 1883.

Witnesses,
Geo. H. Strong
J. H. Nourse

Inventor,
Geo. W. Bonds,
By Dewey & Co.
Att'ys

UNITED STATES PATENT OFFICE.

GEORGE W. BONDS, OF SAN FRANCISCO, CALIFORNIA.

KEY-SEAT-CUTTING MACHINE.

SPECIFICATION forming part of Letters Patent No. 289,060, dated November 27, 1883.

Application filed October 16, 1882. (No model.)

*To all whom it may concern:*

Be it known that I, GEORGE W. BONDS, of the city and county of San Francisco, State of California, have invented an Improved Key-Seat-Cutting Machine; and I hereby declare the following to be a full, clear, and exact description thereof.

My invention relates to an improvement in that class of machines for cutting or slotting keyways in wheels, pinions, pulleys, &c., where the cutter is made with teeth or cutters on the edge, like a milling-tool, and of the exact width of the slot to be cut.

My invention consists of a moving table provided with suitable adjustable chucking jaws and slots for fastening the work to be operated upon, and both hand and automatic feeding attachments to move the work to the cutter, instead of feeding the cutter to the work, as is customary in this class of machines. I provide an automatic relief motion to save the wear of the cutter on the back-stroke, and I also provide an automatic stop to gage the cut to any desired depth. The cutter and cross-head are provided with adjustments to fix the taper at any desired angle, and they are locked with adjustable steel rollers below and above the cut, to prevent springing, thus making the keyway exactly straight.

Figure 1:
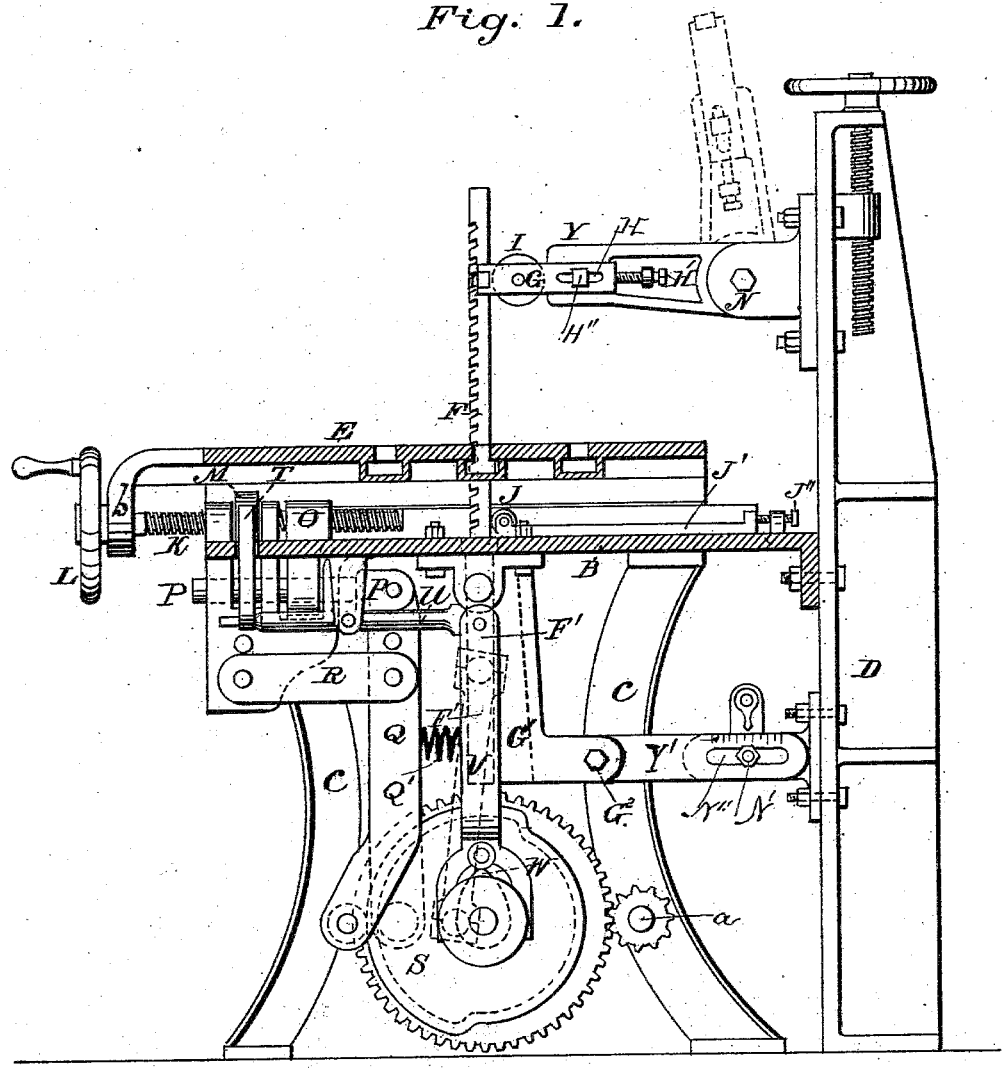
Figure 6:
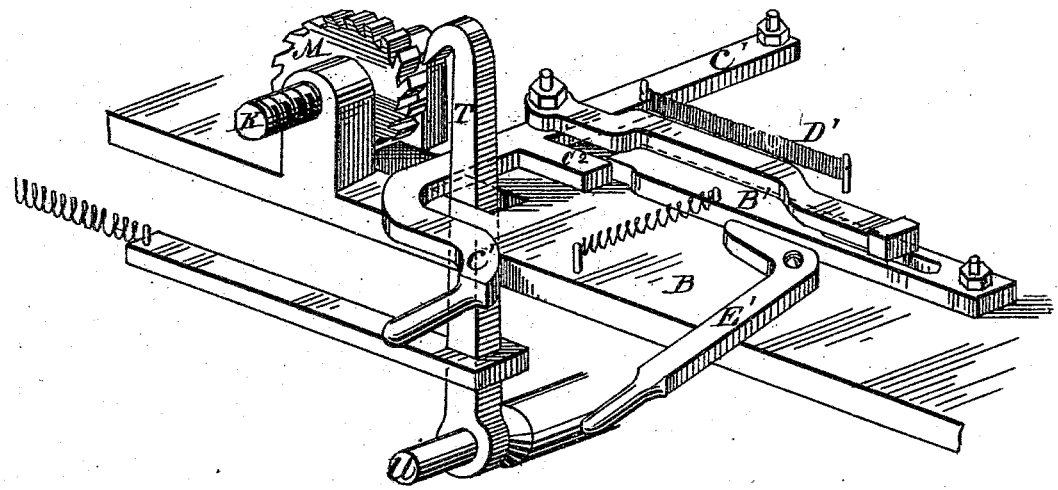
Figure 7:
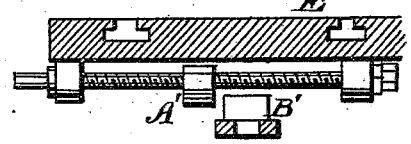
Figure 8:
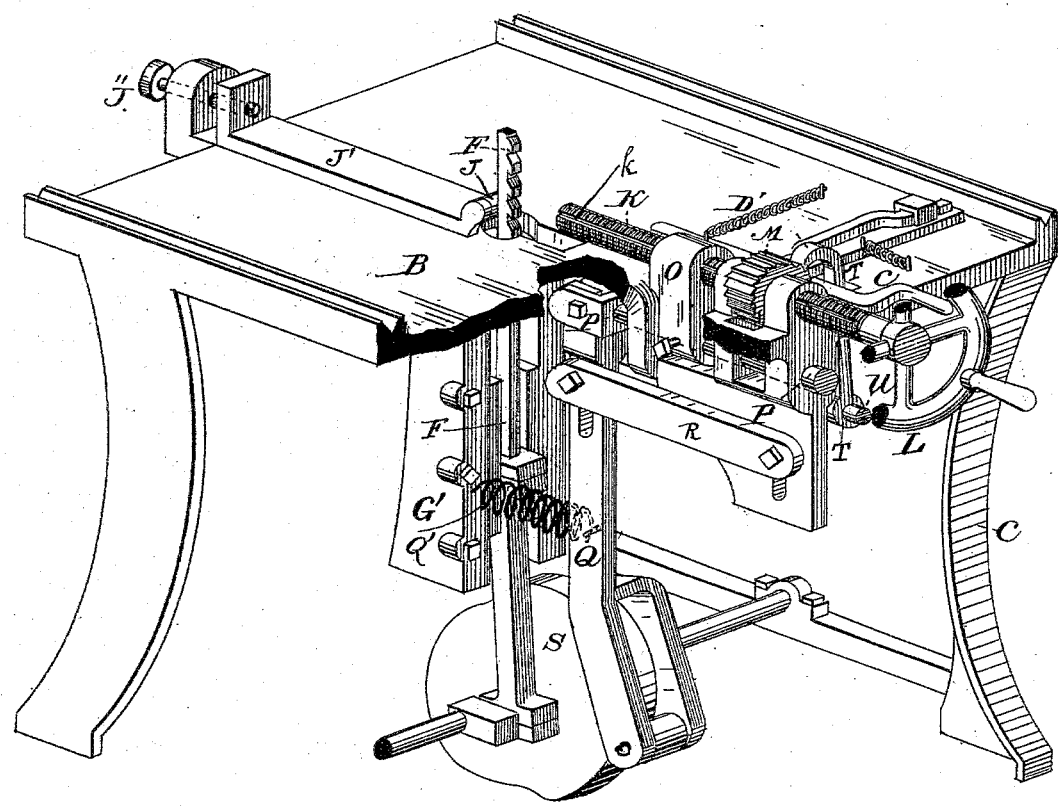
Figure 9:
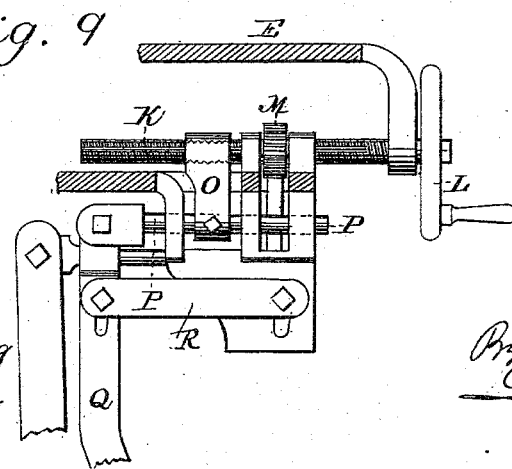

In the drawings, Figure 1 is a side view and section through the frame and feeding-table at A in Fig. 2. Fig. 2 is a front elevation. Fig. 3 is a section plan, showing the automatic stop-motion. Fig. 4 is a section through the cross-head, showing the connecting-rod and cutter-fastenings. Fig. 5 is a front elevation of cutter-fastenings. Fig. 6 is a perspective view of automatic stop-motion. Fig. 7 is a transverse section through moving table, showing automatic nut. Fig. 8 is a view of the machine with the traveling table and part of the driving mechanism removed. Fig. 9 is a vertical cross-sectional detail, showing the connection between the feeding-screw and moving table.

Let B, C, and D represent the main frame that supports the working parts; E, the moving table to which the piece to be slotted is fastened.

F is the cutter, which is sustained against the resistance of the material being cut by means of two steel rollers, I and J, bearing against its back. The upper roller, I, is pivoted in a guide-bar, G, which is adjustably secured to an arm, Y, by means of the bolt H'', passing through slot H, and the set-screw H'. The arm Y is pivoted at N to a bracket on the standard D, for a purpose hereinafter explained. The lower roller, J, is pivoted on one end of a sliding arm, J', the other end of which carries the set-screw J'', by which said arm may be adjusted backward or forward. The cutter F is continued downward in the arm F', which slides in the guideway G'. This guideway has an elbow at its lower end, which is secured by a bolt, G², to an adjustable arm, Y'. A bracket extending out from the standard D, with a slot, N'', carries a fixed pointer. The arm Y' is also slotted, and carries on its face a scale, as seen in Fig. 1, and said arm may be adjusted toward and from the standard and secured in position by the nut N', and through the nut and bolt G'' the inclination of the guideway G' may be regulated as desired. The cutter can thus be made to cut at any angle, and the two steel rollers I and J prevent its springing. A reciprocating motion is given the cutter by a crank and connecting-rod in the usual manner.

K is the feed-screw.

L is the hand feed-wheel.

M is the ratchet-wheel for the automatic feed.

O is the nut on feed-screw, which is fastened to and is part of the relief motion, composed of shafts P, rock-lever Q, adjustable swinging fulcrum R, and the cam-wheel S, keyed to crank-shaft, suitably shaped to push the feed-table from the cutter during the back or upward stroke and pull it forward again the instant the cutter starts down to commence the new cut.

The automatic feed-motion is obtained as follows: A feed-screw, K, has a hub or bushing, in which it turns, in the downwardly-bent end *b* of the table E, and passes back over the table-frame B, through unthreaded guideways, and into and through a threaded adjustable nut, O, which remains stationary in relation to the rod P, but moves with it as it reciprocates. Throughout its length screw K is grooved, as seen at $k$, and in this groove fits a feather on the interior of the unthreaded ratchet-wheel M, through which the screw passes, and with which it thus engages, the ratchet being prevented from moving up or down the screw by the unthreaded guideways, between which it rests. (See Fig. 8.) A pawl, T, projects upwardly through a slot in table-frame B and engages with the ratchet M. The lower end of pawl T is pivoted on the end of the vibrating lever U, which is moved up and down by means of pitman V and eccentric W on the driving-shaft. At each revolution of the driving-shaft the pawl T seizes a tooth of the ratchet M and turns it, thereby, through the medium of the feather and groove, driving the screw K through the nut O and feeding-table E toward the cutting-tool.

The automatic stop-motion is composed of nut and screw A', fast to the moving-table E. B' is a trip latch or stop; C', a set-lever passing in front of pawl T, and D' is a spring holding pawl T from contact with ratchet M. To set the automatic stop to trip at the desired depth of keyway, push set-lever C' toward ratchet M until trip-latch B' engages lug $C^2$ on set-lever C'; cut one keyway the desired depth, stopping it by use of hand-stop E', then screw nut A' until it touches trip-latch B'. The table E is then retracted for the next cut, and after the cutter has proceeded to the point desired, nut A' is, by the forward feed of the table, brought in contact with the latch B' and disengages it from lever $C^2$ and withdraws pawl T from the ratchet and stops the feed. The machine will now duplicate as many keyways of the same kind as may be desired, the wear of the cutter being so slight that the machine may be run all day on one kind of work without resetting. The crank-shaft gives motion to the entire machine, and is driven from a counter-shaft, $a$, through a train of gears. The gearing increases the leverage of power over the cutter, so that the motion is very strong and positive, and the work is smoothly and quickly done.

The difficulty heretofore with machines of this kind has been that the cutter was fed to the work, changing its movement at every stroke out of a parallel line with its previous cut, thus leaving the bottom of the keyway rounding and higher in center than at either end, and changing the taper at every stroke, which necessitated the use of files to true it up. My improved machine avoids this by feeding the work to the cutter, thus securing a movement of the cutter absolutely parallel with its previous cut. Keyways of any taper, or straight ones, are easily cut. The rounding up of the bottom of keyway by the springing of the cutter is entirely avoided by the two steel rollers I and J being placed close to each side of the cut.

The extension-arm Y is hinged at N to facilitate putting in and taking out the work. The supporting-roll I being raised up from against the cutting-tool, as indicated in dotted lines in Fig. 1, the work is passed over the cutter F and properly keyed to the table. The table E is then moved up by hand-wheel L until the work is in contact with the cutter, which, for illustration, is at the highest point of its stroke. The supporting-roll I is then replaced to support the upper end of the tool. Power is applied and the cutter makes the downward stroke. At the moment the downstroke is finished, and before the cutter starts upward, the roller on the lower end of lever Q is drawn down into the lowest portion of cam S by spring Q', and lever Q, pivoted to link R, throws rod P, nut O, which is fastened by a set-screw to rod P, screw K, and the table E containing the work back from the cutter. At the same time that the cutter reaches its highest point the high portion of cam S throws the lever Q toward the front of the machine and carries table E and the work back to the cutting-point. As the key-seat is cut the work is fed forward by the hand-wheel L, if desirable.

To obtain a precision of dimension in the key-seats when many are to be cut alike, I use the automatic tripping device heretofore described to automatically stop the automatic feeding mechanism when a proper depth of cut has been made. A spring-bar, C', provided with a shoulder, $C^2$, which lies on the upper surface of B, between pawl T and the ratchet M, is normally pressed against the pawl by means of a spring, D', so as to disconnect the pawl and ratchet. A pivoted detent, B', is brought against the end of the top $C^2$, after C' has been retracted from contact with the pawl, and holds C' in a position to allow the pawl to operate. On the bottom of the table E a screw sustained by proper means bears a nut, A', at such a height that its edge is adapted, as table E moves forward, to come in contact with the pivoted detent B'. The nut A' can be run along the screw, so as to move B' out of contact with $C^2$ at any desired forward movement or depth of cut, and thus stop the feed instantly at a predetermined depth. When it is desired to trip the detent B' by hand, the lever E' is used.

By the use of my improved automatic feed and stop motion I am enabled to employ apprentice-boys and do the work with the same speed and accuracy as an experienced machinist.

Having thus described my invention, what I claim as new, and desire to secure by Letters Patent, is—

1. In a key-seat-cutting machine, the adjustable guideway G', in combination with the adjustable guide-rollers I and J, substantially as described.

2. In a key-seat-cutting machine, the cam-wheels S, lever Q, shaft P, nut O, spring Q', and screw K, for the purpose of relieving the cutter from wear on the upward stroke, substantially as described.

3. In a key-seat-cutting machine, an automatic feeding device consisting of cam W, rod V, rocking arm U, pawl T, ratchet M, and screw K, substantially as described.

4. The device for stopping the feed, consisting of the screw and nut A' in the moving table E, trip-latch B', set-lever C', provided with lug C², spring D', and pawl T, substantially as described.

In witness whereof I have hereunto set my hand.

GEO. W. BONDS.

Witnesses:
GEO. H. STRONG,
BYRON JACKSON.